(12) United States Patent
Bois et al.

(10) Patent No.: US 7,302,020 B2
(45) Date of Patent: Nov. 27, 2007

(54) ENCODED MULTI-ACCESS BUS SYSTEM AND METHOD

(75) Inventors: Karl Joseph Bois, Fort Collins, CO (US); David W. Quint, Fort Collins, CO (US); Vaishnav Srinivas, Los Angeles, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1060 days.

(21) Appl. No.: 10/151,572

(22) Filed: May 20, 2002

(65) Prior Publication Data

US 2003/0214978 A1 Nov. 20, 2003

(51) Int. Cl.
*H03D 1/00* (2006.01)
*H04L 27/06* (2006.01)

(52) U.S. Cl. .............. 375/342; 375/142; 375/130; 370/209; 370/441

(58) Field of Classification Search ............ 375/242, 375/142, 130; 370/209, 441
See application file for complete search history.

(56) References Cited

U.S. PATENT DOCUMENTS

| | | | | |
|---|---|---|---|---|
| 5,371,750 A | * | 12/1994 | Inoue et al. | 714/755 |
| 5,416,797 A | * | 5/1995 | Gilhousen et al. | 370/209 |
| 5,621,800 A | * | 4/1997 | Weng et al. | 380/266 |
| 5,659,573 A | * | 8/1997 | Bruckert et al. | 375/142 |
| 5,675,751 A | * | 10/1997 | Baker et al. | 710/305 |
| 5,771,348 A | * | 6/1998 | Kubatzki et al. | 726/2 |
| 5,790,817 A | * | 8/1998 | Asghar et al. | 710/311 |
| 6,356,555 B1 | * | 3/2002 | Rakib et al. | 370/441 |
| 6,396,880 B1 | * | 5/2002 | Stroud | 375/308 |
| 6,584,594 B1 | * | 6/2003 | Walters, Jr. | 714/763 |
| 6,603,804 B1 | * | 8/2003 | Khoini-Poorfard et al. | 375/152 |
| 6,703,953 B2 | * | 3/2004 | Maeda et al. | 341/144 |
| 2003/0095662 A1 | * | 5/2003 | Jarosinski et al. | 380/268 |

OTHER PUBLICATIONS

Robert C. Dixon, "Spread Spectrum Systems", 2nd Edition. 1984, Wiley & Sons.*

* cited by examiner

*Primary Examiner*—David C. Payne
*Assistant Examiner*—Nader Bolourchi

(57) ABSTRACT

A bus system includes multiple devices and a bus. The bus is connected to each device. Each device may include a type of input/output (I/O) device, such as a random access memory (RAM) or a microprocessor. The bus transfers data between devices. Data of each device may be encoded with a unique orthogonal code. Encoded data of each device may be superimposed onto a bus so as to permit substantially concurrent communication on the bus by each of the devices. Data of each device is decoded by correlating the encoded data with the unique code used to form the encoded data.

37 Claims, 12 Drawing Sheets

ENCODED MULTI-ACCESS BUS SYSTEM AND METHOD

BACKGROUND OF THE INVENTION

Data devices such as microprocessors and controllers often share a common bus within an electronic system. The bus interfaces between these devices as a "shared resource," meaning only one device accesses the bus at any one time; other devices wait for access during use by the transmitting device. Controllers often mediate between the timing and use of the devices on the bus.

When a device with data to transmit waits for access to the bus, a system latency ensues. Moreover, device controllers that mediate between devices create an overhead inefficiency for the system, creating additional latencies. Bus turnaround operations induce additional latency; that is, bus controllers delay future access to the bus following prior bus transmissions to avoid reflections and to optimally drive the bus. By way of example, those skilled in the art appreciate that a bus agent commonly controls and mediates input/output (I/O) by and between many devices on a system bus.

The invention provides systems and methods for simultaneous communication between devices on a common bus. One feature of the invention provides orthogonally coded bus transmission protocols to permit concurrent communications between a plurality of devices on a bus. Other features of the invention will be apparent within the description that follows.

SUMMARY OF THE INVENTION

In one aspect, the invention provides a bus system for allowing access to a bus by a first device and a second device. The bus system includes an encoder that encodes data of the first device with a first code and encodes data of the second device with a second code. The encoder may be communicatively connected to a gate such that the gate superimposes encoded data of the first device to encoded data of the second device on the bus. The bus may be a parallel data bus. Each of the first and second devices may for example be an input/output (I/O) device such as a microprocessor, and/or a random access memory device (RAM).

In one aspect of the invention, the bus system includes a correlator communicatively connected to the gate. The correlator may be configured to correlate the encoded data of a device (e.g., the first or second device) with a code that encodes the data. The correlator may include a synchronizer for synchronizing the code with the encoded data of the device. The encoded data may be received from a parallel data bus. The correlator may include a code generator communicatively connected to the synchronizer for generating a synchronized code with the encoded data. The correlator may include a multiplier communicatively connected to the synchronizer for multiplying the encoded data with the synchronized code. The correlator may include an integrator for integrating a product of the multiplier to generate a decoded data of the device. The correlator may include a sample-and-hold unit communicatively connected to the integrator for clocking the decoded data of the device, and a clock communicatively connected to the sample-and-hold unit for providing a clock signal to the sample-and-hold unit. The clock signal may be derived from a global clock that also provides other clock signals used for encoding the data. The correlator may include a comparator communicatively connected to the sample-and-hold unit and communicatively connected to the synchronizer for detecting a threshold of the decoded data and feeding back the decoded data to the synchronizer to provide and/or improve acquisition of the encoded data of the device.

In one aspect of the invention, the bus system may include an amplifier communicatively connected to the encoder and configured to amplify the encoded data of a device (e.g., the first or second device). The bus system may include a filter communicatively connected to the amplifier to filter the encoded data of the device. The bus system may further include a tuner that tracks the encoded data of the device. The amplifier, filter, and tuner may for example operate either as a phase-locked loop (PLL) or as a delay locked loop (DLL).

In one aspect of the invention, the first code is substantially orthogonal to the second code. The first and second codes may for example include a pseudo-random noise code, Gold code, and/or a Walsh code.

In one aspect of the invention, the encoder includes a code generator for generating the first code and/or the second code. The encoder may include a logic gate communicatively connected to the code generator for logically combining data of a device (e.g., the first or the second device) with the first and/or the second codes. The logic gate may for example be an exclusive-NOR logic gate, also known as an equivalence gate or a coincidence gate. The encoder may include a driver communicatively connected to the logic gate for outputting the encoded data to the bus.

BRIEF DESCRIPTION OF THE DRAWINGS

A more complete understanding of the invention may be obtained by reference to the drawings, in which.

DETAILED DESCRIPTION OF THE DRAWINGS

Figure 1:
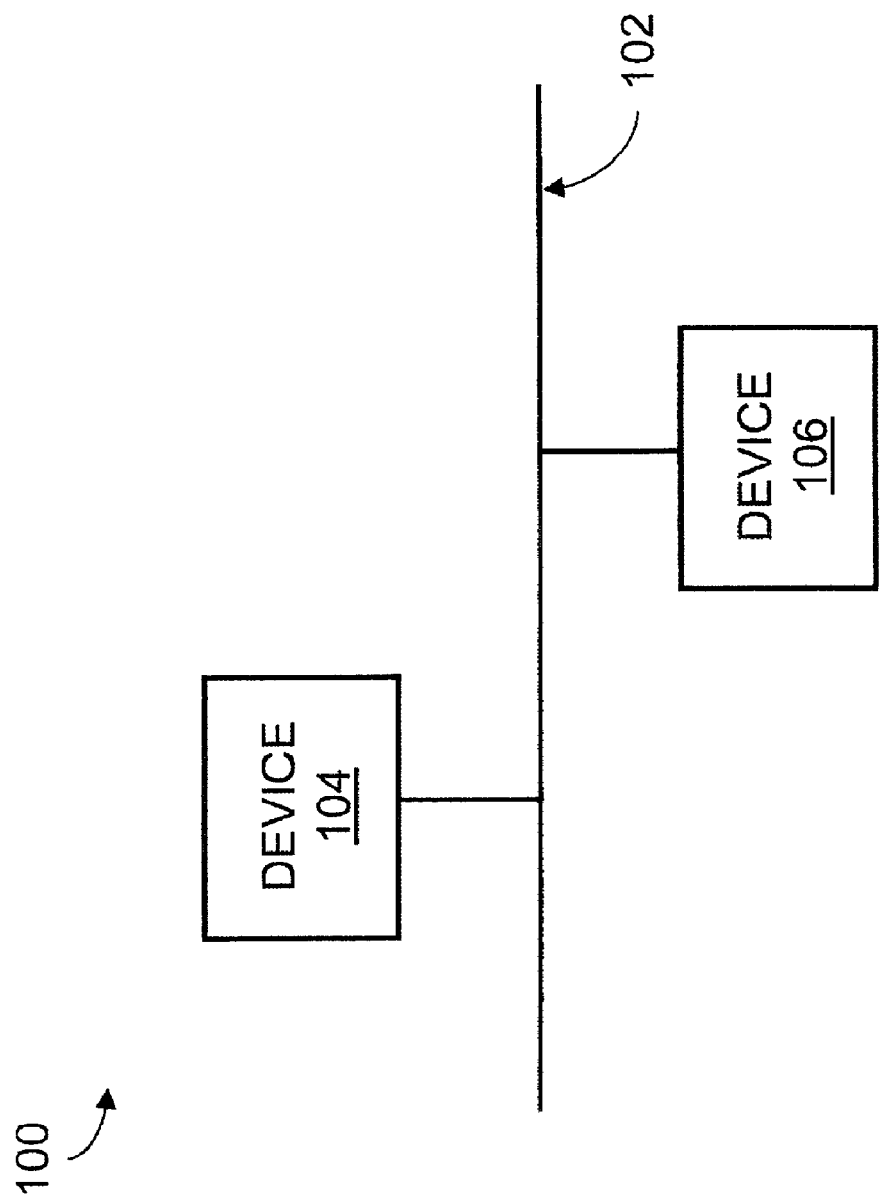
FIG. 1 shows one system with two devices communicating on a common bus, in accord with the invention.

FIG. 1 shows bus system 100, in accord with one embodiment of the invention. Bus system 100 includes device 104, device 106, and bus 102. Bus 102 is connected to device 104 and to device 106. Device 104 may include an input/output (I/O) device. An example of an input/output device may include a memory device such as a random access memory (RAM) device. Another example of an input/output device may include a microprocessor. Device 106 may also include an input/output device. Bus 102 may transfer data between device 104 and device 106. An example of bus 102 is a 32-bit parallel data bus.

Those skilled in the art should appreciate that system 100 may include a plurality of additional devices connected to bus 102, as a matter of design choice, so that this plurality of the devices may communicate concurrently with other devices on bus 102.

Bus system 100 operates to encode data of device 104 with a first code. Bus system 100 also operates to encode data of device 106 with a second code that differs from the first code. The first and second codes are for example orthogonal codes. Encoded data of device 104 is superimposed with encoded data of device 106 on bus 102.

An orthogonal code may be a code with two or more digital sequences. The two or more digital sequences have a product of two unique sequences in which an integral of the product produces a sequence of substantially all zeros. An example of an orthogonal code is a Walsh code. Other examples of orthogonal codes include Gold codes and/or pseudo-random noise (PN) sequences. Those skilled in the art should appreciate that other types of codes may be used to encode the data of the first device and the data of the second device.

Figure 2:
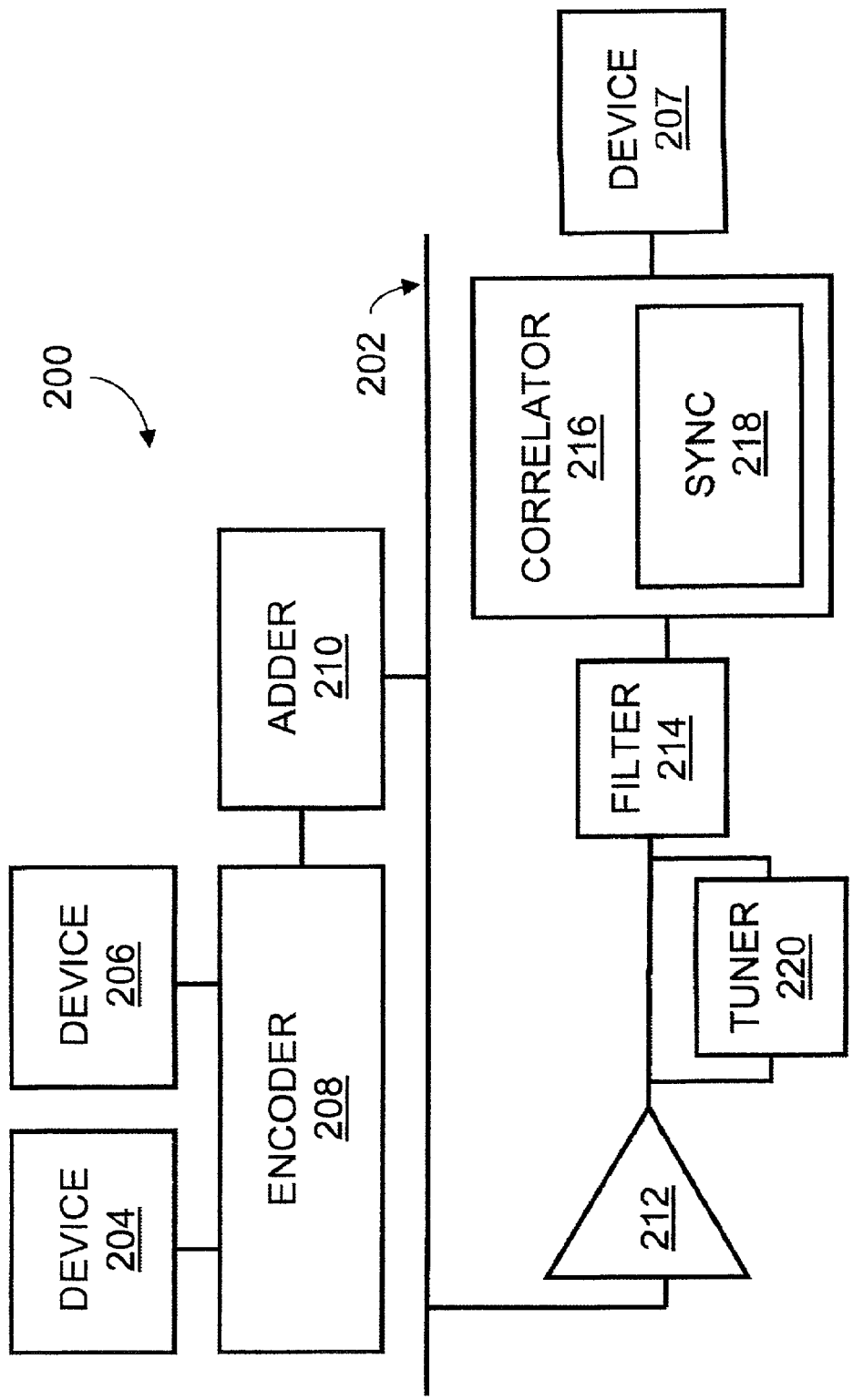
FIG. 2 shows one system with an encoder communicatively connected to a gate, in accord with the invention.

FIG. 2 shows bus system 200, in accord with one embodiment of the invention. Bus system 200 includes device 204, device 206, bus 202, encoder 208, and gate 210. Device 204 and device 206 are communicatively connected to encoder 208. Encoder 208 encodes data of device 204 with a first code. Encoder 208 also encodes data of device 206 with a second code. Encoding may be performed by various methods. An example of one such method of encoding may include multiplying data of a device, such as device 204, with an orthogonal code, such as a Walsh code. Multiplying data may include logically combining data of the device with the orthogonal code through an exclusive NOR (XNOR) gate. Gate 210 is communicatively connected to encoder 208. Gate 210 superimposes encoded data of the device 204 with encoded data of the device 206 on bus 202. An example of gate 210 may include a digital to analog converter.

Bus system 200 may further include amplifier 212, filter 214, tuner 220, and correlator 216. Amplifier 212 is communicatively connected to gate 210 through bus 202. Amplifier 212 may be configured to increase a gain of a composite signal on bus 202. The composite signal may include the encoded data of device 204 superimposed with the encoded data of device 206. Amplifier 212 is also communicatively connected to tuner 220 and to filter 214. Tuner 220 may be configured to track codes used to encode data of devices 204 and 206. Filter 214 may be configured to filter the composite signal and, if desired, any noise that may be inherent to bus 202. In one embodiment, there are N (N≧2) devices connected for communication on bus 202 and filter 214 is a corresponding bank of N filters. Amplifier 212, filter 214, and tuner 220 may operate as a phase-locked loop (PLL).

Bus system 200 may also include correlator 216 and device 207, as shown. Correlator 216 is communicatively connected to device 207. Correlator 216 decodes the encoded data of other devices, such as devices 204 and 206, for use in device 207. In particular, correlator 216 may be configured to receive encoded data from encoder 208. Correlator 216 correlates the encoded data with a code previously used to encode the data of the other devices, for example devices 204 and 206. Examples of codes used to encode the data may include orthogonal codes such as Walsh codes, Gold codes, and/or pseudo-random noise (PN) sequences. The code may be correlated against the encoded data to extract underlying data. Correlator 216 may include synchronizer 218 used to synchronize the code with the encoded data; synchronizer 218 clocks the code at a rate of the encoded data.

Device data may be encoded and bus system 200 may act as a signal summation device that superimposes encoded data from multiple devices. A receiving device connected with bus 202, such as device 207, accesses bus system 200 to receive the composite signal that includes the encoded data. Device 207 may amplify and filter the composite signal. Device 207 may also tune the composite signal with respect to a code used to encode the data of a particular device, such as device 204. The device may further correlate the encoded data of the composite signal against a code used to encode the data of the particular device. By correlating the encoded data, the data of the particular device can be extracted by device 207. Correlation of the encoded data may be synchronized with a clock to achieve timely correlation.

In one embodiment, device 204 and device 206 may transmit on bus 202 concurrently. Gate 210 for example sums data from device 204 and device 206 as a combination of signals, y(t), such that $$y(t)=s_1(t)c_1(t)+s_2(t)c_2(t), \quad (1)$$

where $s_1$ is a data sequence with respect to time of device 204, $c_1$ is the code used to encode $s_1$, $s_2$ is a data sequence with respect to time of device 206, and $c_2$ is the code used to encode $s_2$. A received signal may, therefore, include y(t), and any additional possible noise inherent to bus 202. The received signal may be acquired by a phase-locked loop, such as that provided by amplifier 212, tuner 220, and filter 214. Since $s_1$ is included in y(t), it can be decoded by multiplying, or logically combining, y(t) with $c_1$ which produces a signal, y'(t), such that $$y'(t)=s_1(t)c_1(t)c_1(t)+s_2(t)c_2(t)c_1(t). \quad (2)$$

Since $c_1$ and $c_2$ are substantially orthogonal, an integration of y'(t) yields $s_1(t)$, or the data of device 204. Similar operations can be performed to decode data of device 206. Orthogonality of codes is further explained in FIG. 3. The two sequences, $c_1$ and $c_2$, may, therefore, be respectively used as unique codes for encoding data of two individual devices. The devices may, thus, simultaneously drive a bus through code division multiple access (CDMA).

Figure 3:
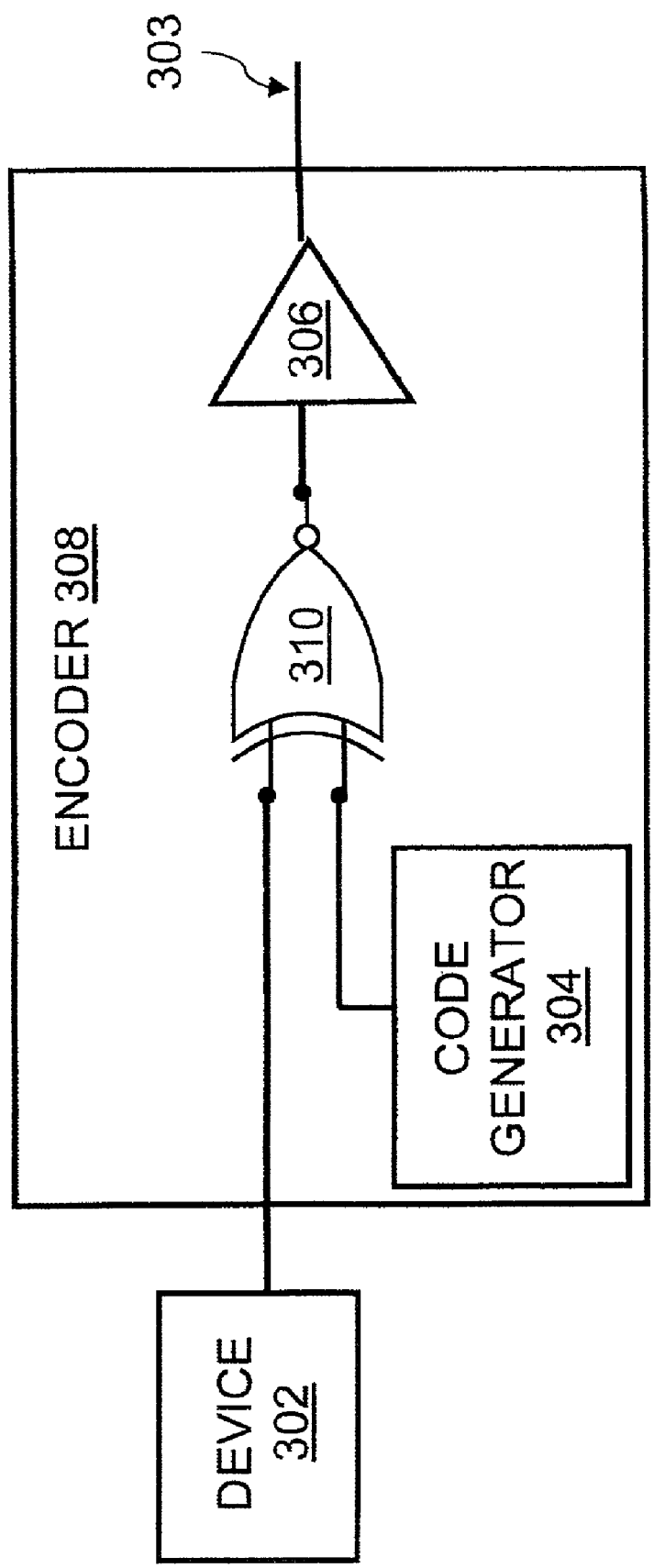
FIG. 3 schematically shows an encoder constructed according to one embodiment of the invention.

FIG. 3 shows encoder 308, according to one embodiment of the invention. Encoder 308 is communicatively connected to receive data of device 302. Encoder 308 includes a logic gate 310, global clock 305, and code generator 304. Code generator 304 is communicatively connected to global clock 305 to synchronize the encoding process. Logic gate 310 may include an exclusive NOR (XNOR) logic gate. Logic gate 310 is configured to receive data from a device, such as device 302. Logic gate 310 is communicatively connected to code generator 304 for receiving a code from code generator 304. Logic gate 310 may XNOR logically combine data from device 302 with the code from code generator 304. Logically combining data from device 302 with the code from code generator 304 encodes data from device 302. Driver 306 is communicatively connected to logic gate 310 to receive the encoded data. Driver 306 may output the encoded data for use on bus 303, which may function like bus 202 of FIG. 2.

Encoder 308 may include multiple code generators, each for example configured like code generator 304. Encoder 308 may include multiple logic gates, each for example configured like logic gate 310. Accordingly, encoder 308 may be communicatively connected with multiple devices, such as device 302, to individually encode data of the multiple devices. The encoder can for example provide a set of substantially orthogonal codes, each device being allocated one unique code of the set of orthogonal codes. Such a code is considered orthogonal if $$\frac{1}{T}\int_0^T c_1(t)c_2(t)\,dt = 0, \text{ and} \tag{3}$$

$$\frac{1}{T}\int_0^T c_1(t)c_1(t)\,dt = 1, \tag{4}$$

where $c_1$ is a first code sequence and $c_2$ is a second code sequence. One example of an orthogonal code is a pseudo-random noise sequence. A pseudo-random noise (PN) code can for example include a maximal-length linear recursive sequence (LRS). An example of one possible LRS code is a 15-bit maximal length LRS generated by a shift register generator having 4 registers, two of which are tapped for generating an output. One 15-bit maximal length LRS may have two taps such that $$\text{tap}_1 + \text{tap}_4 = (\text{tap output}) \tag{5}$$

produces a sequence of $c_1=\{111101011001000\}$. Another 15-bit maximal length LRS may have two taps such that $$\text{tap}_1 + \text{tap}_2 = (\text{tap output}) \tag{6}$$

produces a sequence of $c_2=\{111100010011010\}$. The two sequences, $c_1$ and $c_2$, may be respectively used as unique codes for encoding data of two individual devices. The devices may, thus, access a bus through code division multiple access (CDMA). Shift register generators are known to those skilled in the art.

Advantages to a bus system of the invention includes increased access speed to the bus by devices connected thereto. Devices may share the bus concurrently. Other advantages include using a global clock to synchronize codes for encoding and/or decoding data of multiple devices.

Figure 4:
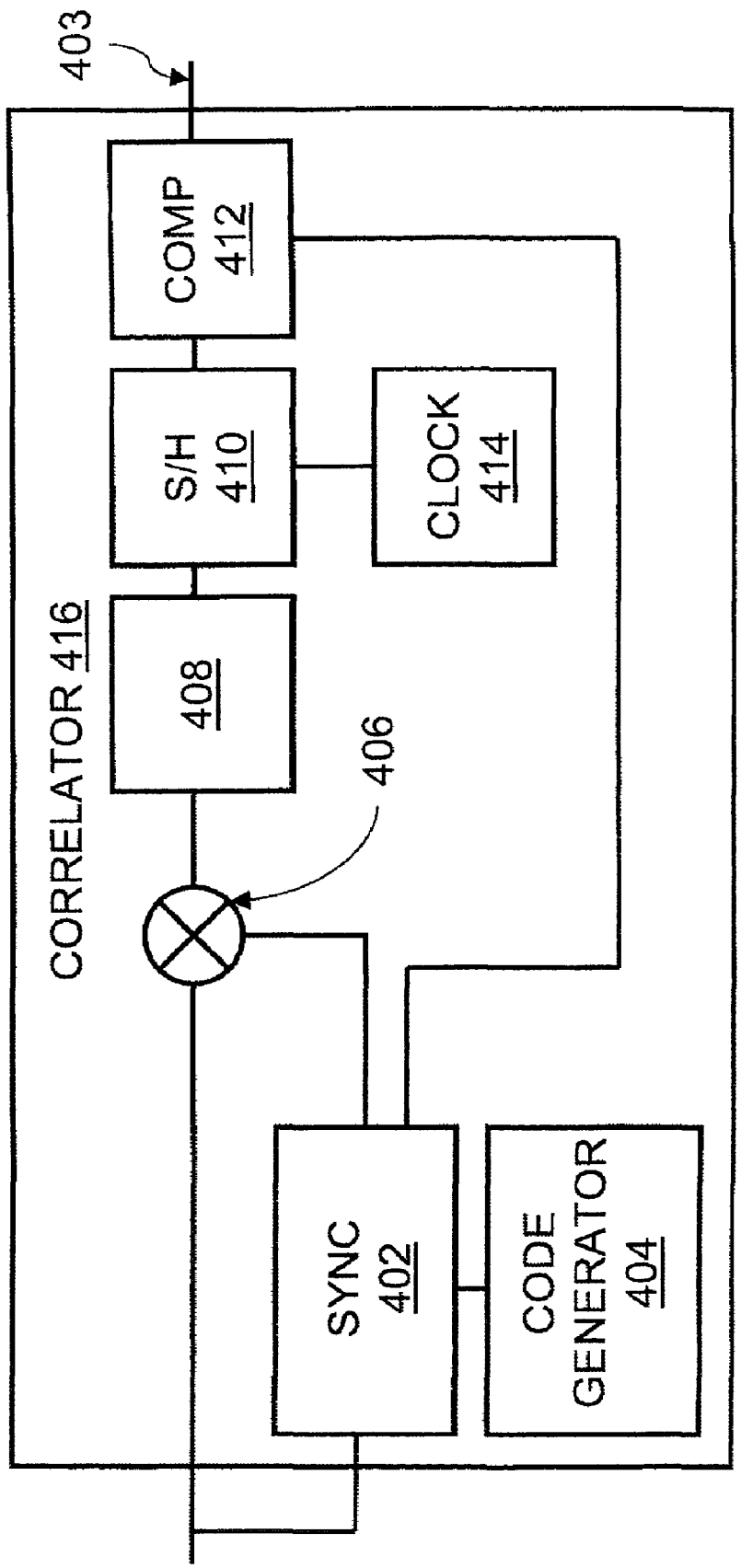
FIG. 4 schematically shows a correlator constructed according to one embodiment of the invention.

FIG. 4 shows one correlator 416 of the invention. Correlator 416 includes synchronizer 402, code generator 404, and multiplier 406. Synchronizer 402 is communicatively coupled to receive encoded signals that may for example include data of a device, such as device 204 of FIG. 2. Synchronizer 402 is communicatively connected to code generator 404. In operation, code generator 404 generates a code used to encode data of the particular device, and synchronizer 402 synchronizes the code from code generator 404 with encoded data of the particular device. Synchronizer 402 is communicatively connected to multiplier 406. Multiplier 406 multiplies synchronized code from synchronizer 402 with encoded data of the particular device. Multiplier 406 is communicatively connected to integrator 408. Integrator 408 integrates a product of data signals, such as the encoded data of the device multiplied by the synchronized code from synchronizer 402. Integration of the product of multiplier 406 is for example performed as $$\frac{1}{T}\int_0^T y'_1(t)c_1(t)\,dt, \tag{7}$$

where $y_1'(t)$ may be substantially the same as $y'(t)$ described in FIG. 2 and $c_1$ is a code sequence that may be substantially the same as the code used to encode the data sequence, $s_1(t)$, described in FIG. 2. Since $c_1$ and $c_2$ are substantially orthogonal, the integration performed by integrator 408 decodes the data encoded by $c_1$ to substantially reproduce original data. For example, the integration of equation (7) may yield $$\frac{1}{T}\int_0^T s_1(t)c_1(t)c_1(t) + s_2(t)c_2(t)c_1(t)\,dt = s_1(t) \tag{8}$$

where $s_1$ is a data sequence with respect to time of a device, such as device 204, $c_1$ is the code used to encode $s_1$, $s_2$ is a data sequence with respect to time of another device, such as device 206, and $c_2$ is the code used to encode $s_2$.

Integrator 408 is communicatively connected to sample-and-hold unit 410. Sample and hold unit 410 is communicatively connected to clock 414. Sample-and-hold unit 410 may be a flip/flop synchronized by clock 414. Clock 414 may also be, for example, global clock 305 connected to code generator 304 of FIG. 3 to synchronize the encoding process. Sample-and-hold unit 410 may "clock out" decoded data at a predetermined rate. Sample-and-hold unit 410 is communicatively connected to comparator 412. Comparator 412 may operate as a threshold detector that can feed back information to synchronizer 402 to achieve a shorter code synchronization period in acquiring a code of the encoded data. A shorter code synchronization period refers to a duration of time that passes before the $c_1$ code used to encode the data is aligned with the encoded data of $y_1'(t)$, for decoding purposes. Comparator 412 may output the decoded data on bus 403 for use by another device, such as device 207 of FIG. 2.

Figure 5:
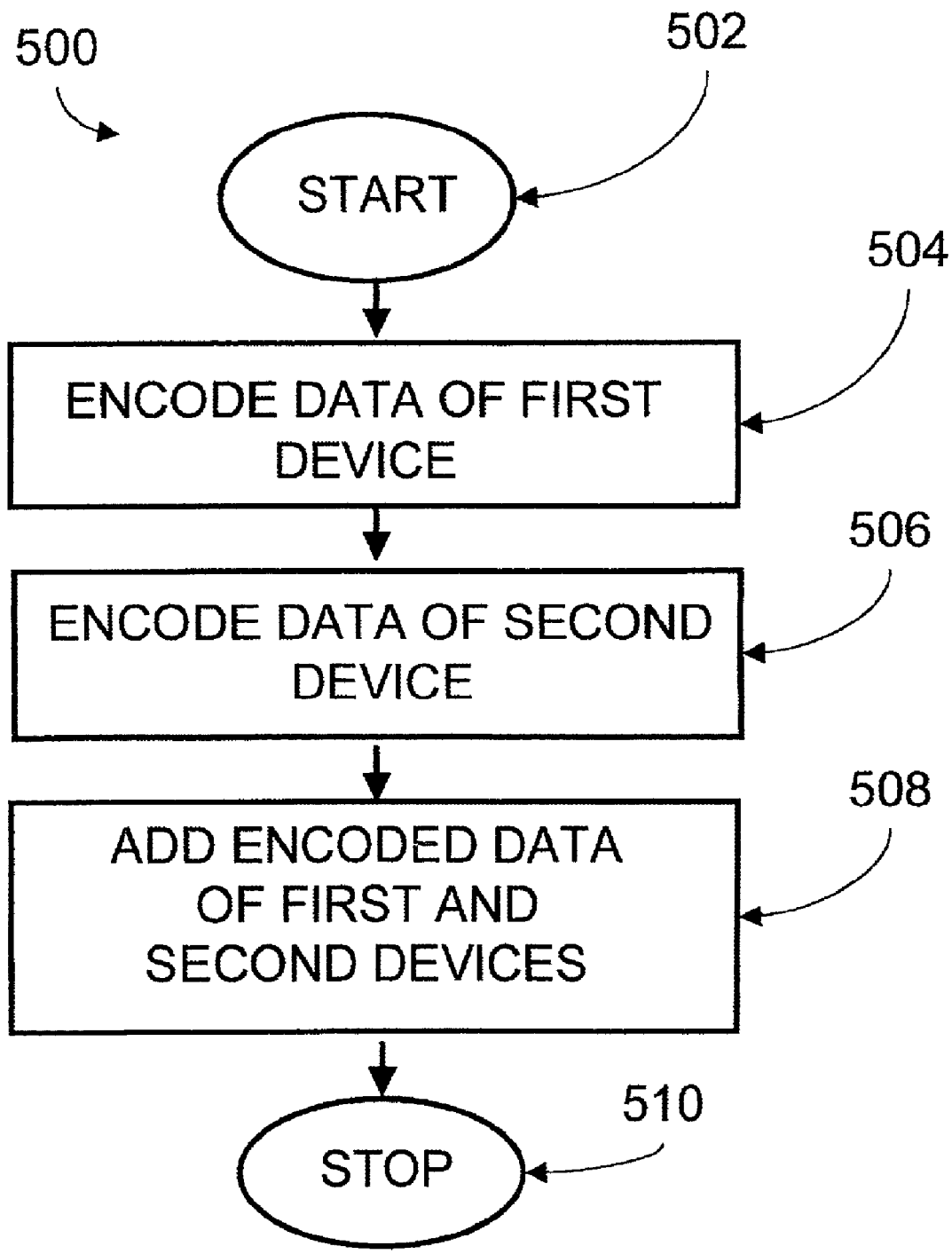
FIG. 5 is a flow chart illustrating device protocol for transmitting and receiving data across the bus, in accord with one method of the invention.

FIG. 5 is a flow chart illustrating device protocol for transmitting and receiving data across the bus, in accord with one method of the invention. Operation 500 commences in step 502. Data of a first device, such as device 204 in FIG. 2, is encoded with a first code in step 504. Data of a second device, such as device 206 in FIG. 2, is encoded with a second code, in step 506. Steps 504 and 506 may operate simultaneously or in any order. The first and second codes may be orthogonal codes. The encoded data of the first device is superimposed with the encoded data of the second device, in step 508. The superposition of the encoded data from the first device to the encoded data of the second device may be performed on the bus or in a bus controller. The operation ends in step 510.

Figure 6:
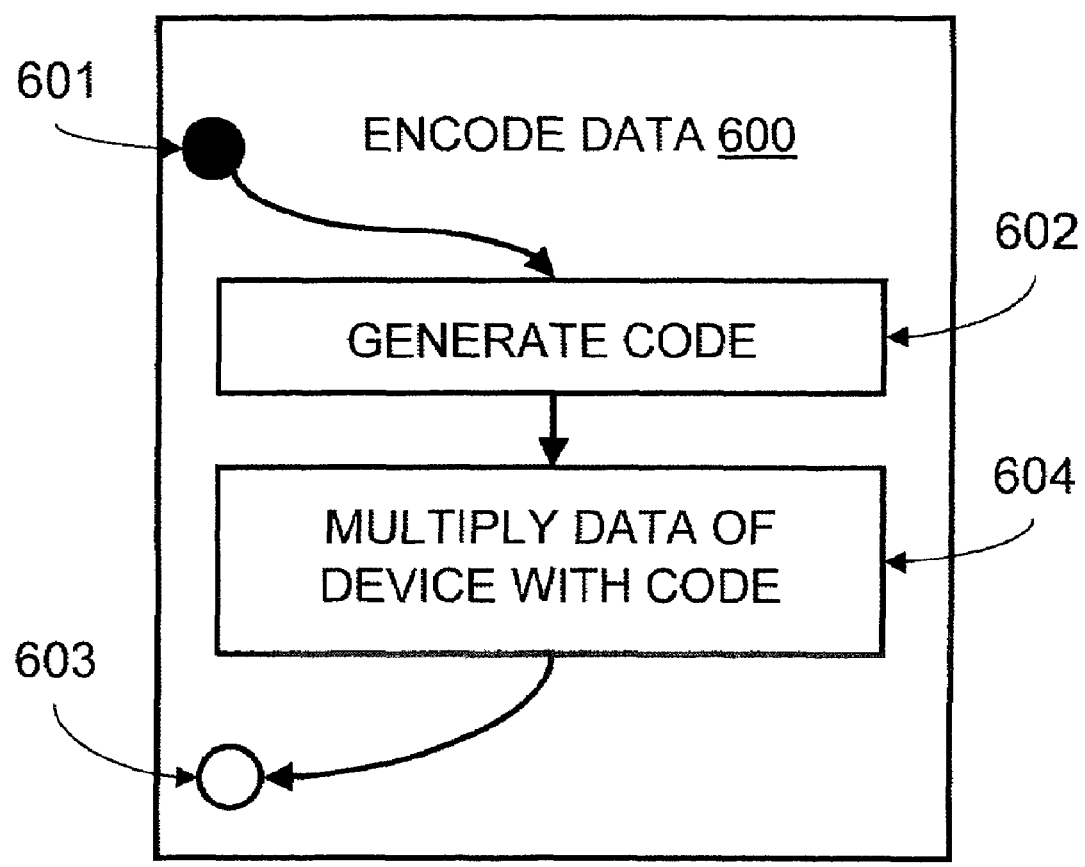
FIG. 6 is a flow chart illustrating a step of encoding data, in accord with one method of the invention.

FIG. 6 is a flow chart illustrating a step of encoding data, in accord with one method of the invention. Encode data step 600 may be similar to steps 502 and 504 of FIG. 5. Encode data step 600 enters through entry point 601. A code that is used to encode the data is generated, in step 602. Encoding of data may be similar to encoding techniques described in encoder 308 of FIG. 3. Data of a device, such as device 204 of FIG. 2, is logically combined with the generated code, in step 604. Logically combining may have the effect of multiplying the data of device 204 with the generated code. Encode data step 600 exits through exit point 603. The code used to encode the data of the device is preferably orthogonal to any other code used to encode the data of the other devices. Those skilled in the art should appreciate that other codes may be used in the methodology of FIG. 6.

Figure 7:
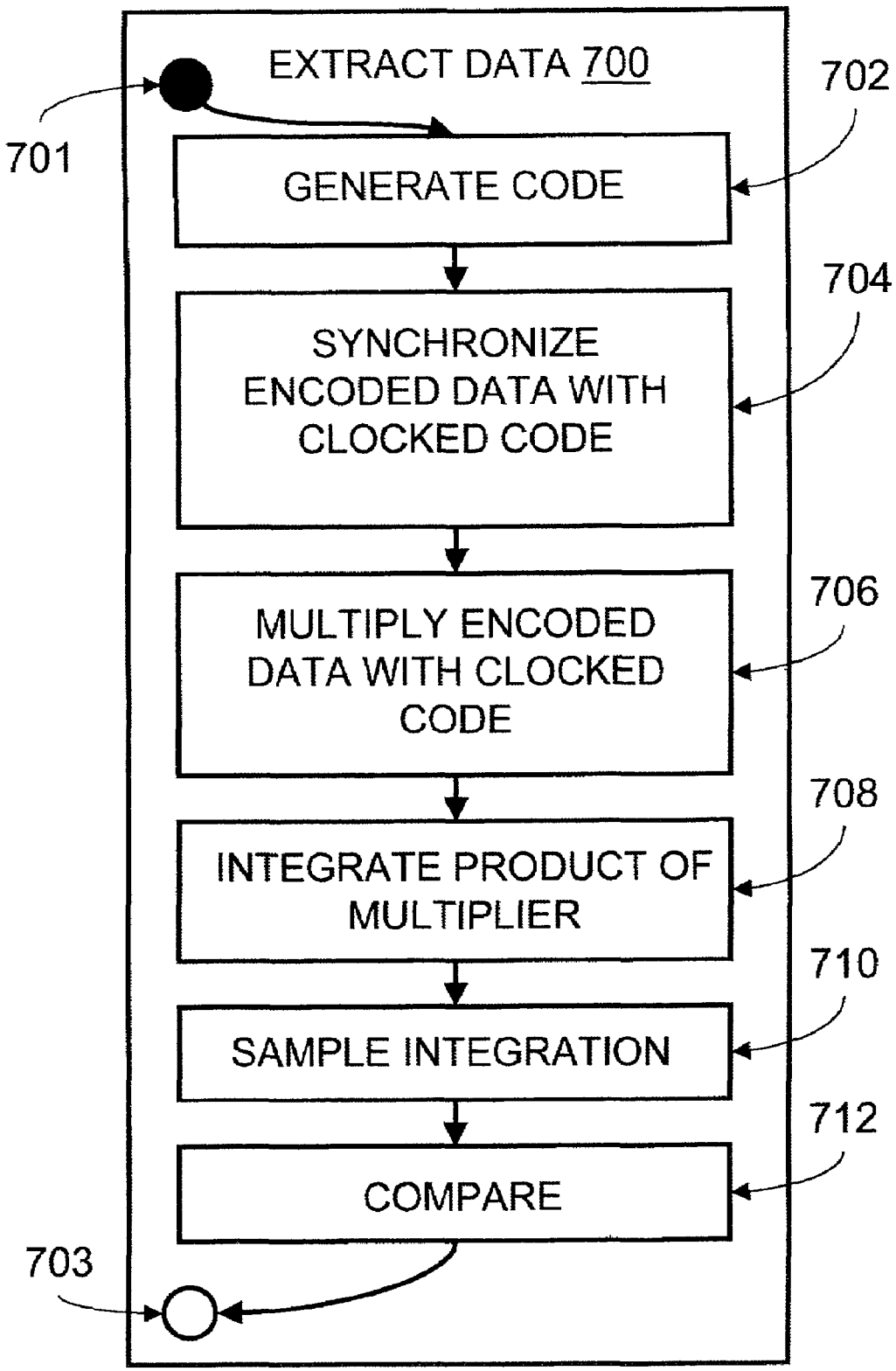
FIG. 7 is a flow chart illustrating a step of extracting data, in accord with one method of the invention.

FIG. 7 is a flow chart illustrating a step of extracting data in accord with one method of the invention. Extract data step 700 may be an additional step of operation 500 of FIG. 5. Extract data step 700 enters through entry point 701 when encoded data is received. In step 702, a code that is substantially the same as the code used to encode the data of a device is generated. The code from step 702 is synchronized to create a synchronized code that is substantially synchronous with the received encoded data, in step 704. The synchronized code is logically combined with the received encoded data, in step 706. A logical combination of synchronized code with the received encoded data may have the effect of multiplying the synchronized code with the received encoded data. The output of the logical combination of step 706 is integrated over time, in step 708. The integration of step 708 may substantially decode the received encoded data to an original un-encoded form. The integration of step 708 is sampled to generate a clocked integrated data of step 708, in step 710. The clocked integrated data of step 710 is compared to a threshold to generate a feedback signal used for reacquiring the code of the encoded data, in step 712. The comparison also outputs the data which may be substantially in the original un-encoded form. Extract data step 700 exits through exit point 703. Extract data step 700 may be similar to the processes used in correlator 416 of FIG. 4. Those skilled in the art should appreciate that other methods of extracting data may be used in accord with the teachings of the invention.

Figure 8:
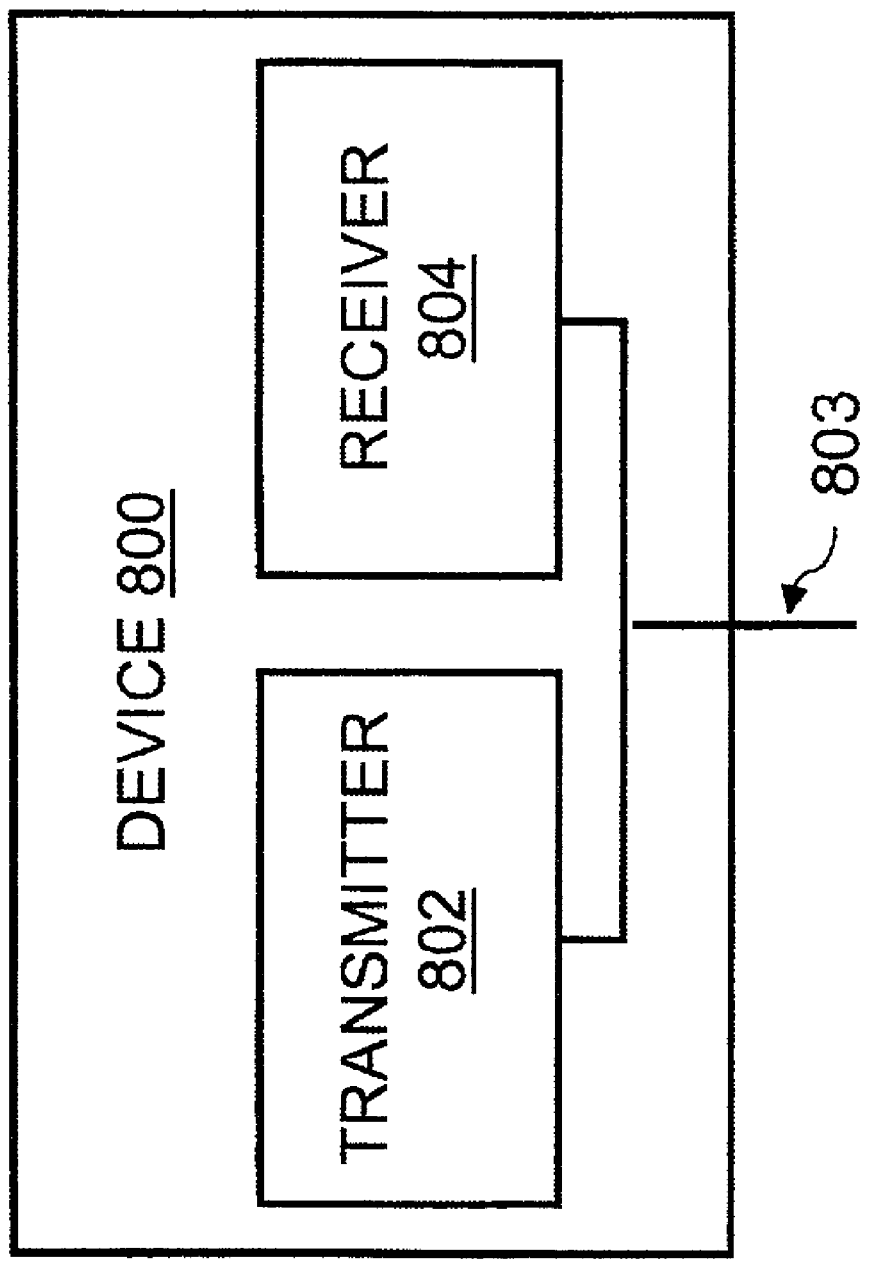
FIG. 8 schematically shows a device according to one embodiment of the invention.
Figure 12:
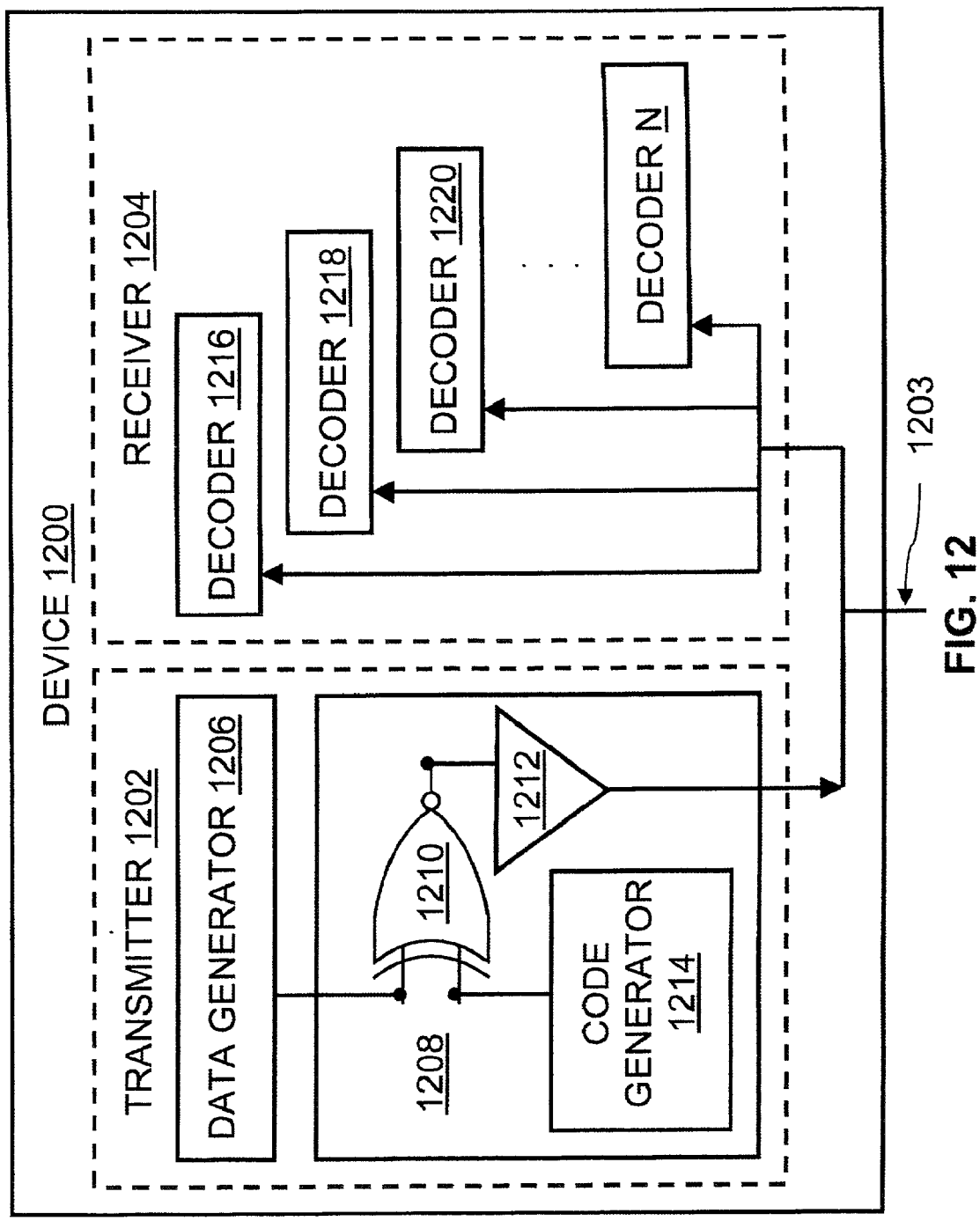
FIG. 12 schematically shows one device, in accord with the invention.

FIG. 8 shows device 800, according to one embodiment of the invention. Device 800 includes transmitter 802 and receiver 804. Transmitter 802 and receiver 804 are communicatively connected to port 803 of device 800. Port 803 of device 800 may function as an input/output (I/O) port communicatively connected to a bus, such as bus 202 of FIG. 2. Device 800, therefore, may operate as an input/output device, such as a random access memory device or a microprocessor that has access to the bus. Transmitter 802 encodes data of device 800 whereas receiver 804 may receive encoded data of another device, such as device 204 of FIG. 2. Receiver 804 may decode data of multiple devices connected to the bus. As such, receiver 804 may employ multiple decoders such that each decoder is used for a respective one of the other devices. Each of the multiple decoders generates a code used previously in encoding the data of its respective device. An example of a device having a receiver for decoding data of multiple devices is shown in FIG. 12.

Figure 9:
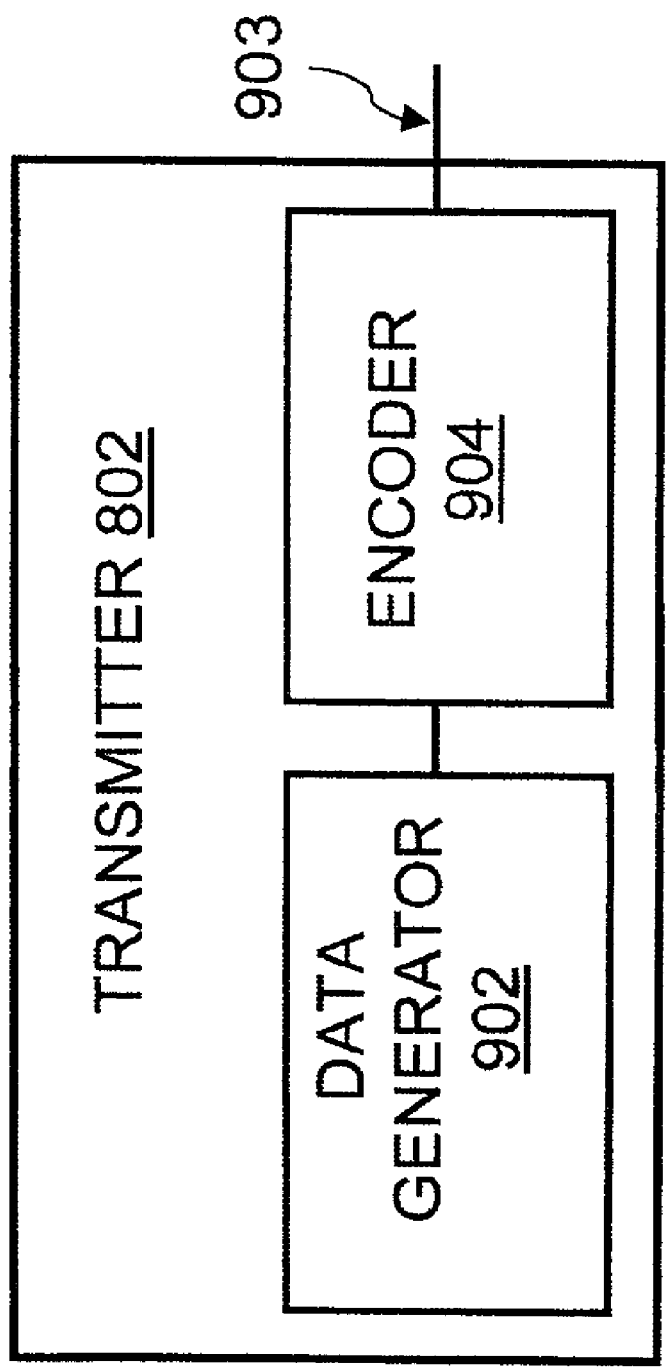
FIG. 9 schematically shows a transmitter of a device according to one embodiment of the invention.

FIG. 9 shows transmitter 802 of the invention. Transmitter 802 may include data generator 902 and encoder 904. Data generator 902 is communicatively connected to encoder 904. Encoder 904 is for example communicatively connected by output port 903 to the input/output port 803 of device 800, FIG. 8. Encoder 904 may operate to encode data of device 800 with an orthogonal code as described in FIG. 3.

Figure 10:
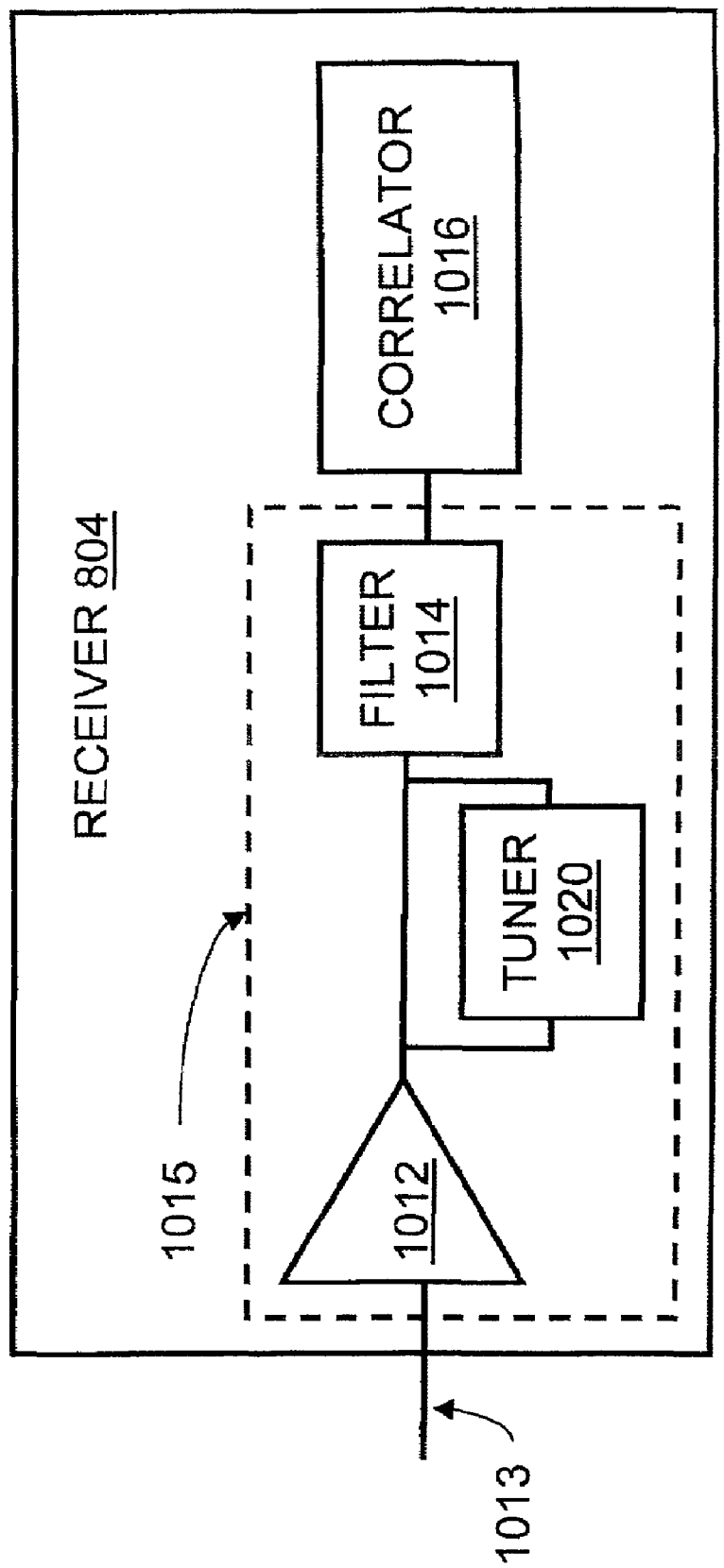
FIG. 10 schematically shows a receiver of a device according to one embodiment of the invention.

FIG. 10 shows receiver 804 constructed according to the invention. Receiver 804 may include phase-locked loop 1015 and correlator 1016. Phase-locked loop 1015 is communicatively connected by input port 1013 to the input/output port 803 of device 800, FIG. 8, and communicatively connected to correlator 1016.

Phase-locked loop 1015 may for example include amplifier 1012, tuner 1020, and filter 1014. Amplifier 1012 is communicatively connected to the input/output port 803 of device 800 through input port 1013. Amplifier 1012 may receive and amplify encoded data of other devices. The encoded data of the other devices may be received as a cumulative signal having the encoded data of the other devices superimposed with one another. The cumulative signal may additionally include noise inherent to a channel, such as bus 202 of FIG. 2. Amplifier 1012 is communicatively connected to tuner 1020 and to filter 1014. Tuner 1020 may be configured to track codes of the other devices. Filter 1014 may be configured to filter the cumulative signal to substantially reduce effects of the noise. Those skilled in the art should appreciate that other embodiments of a phase-locked loop may be employed in accord with the invention. A delay-locked loop may be used as an alternative to phase-locked loop 1015 as a matter of design choice. Correlator 1016 may operate to decode encoded data of the other devices by respectively correlating the encoded data against a unique code used to encode the data of device 800. Decoding methods of correlator 1016 may be similar to those described in FIG. 4.

Figure 11:
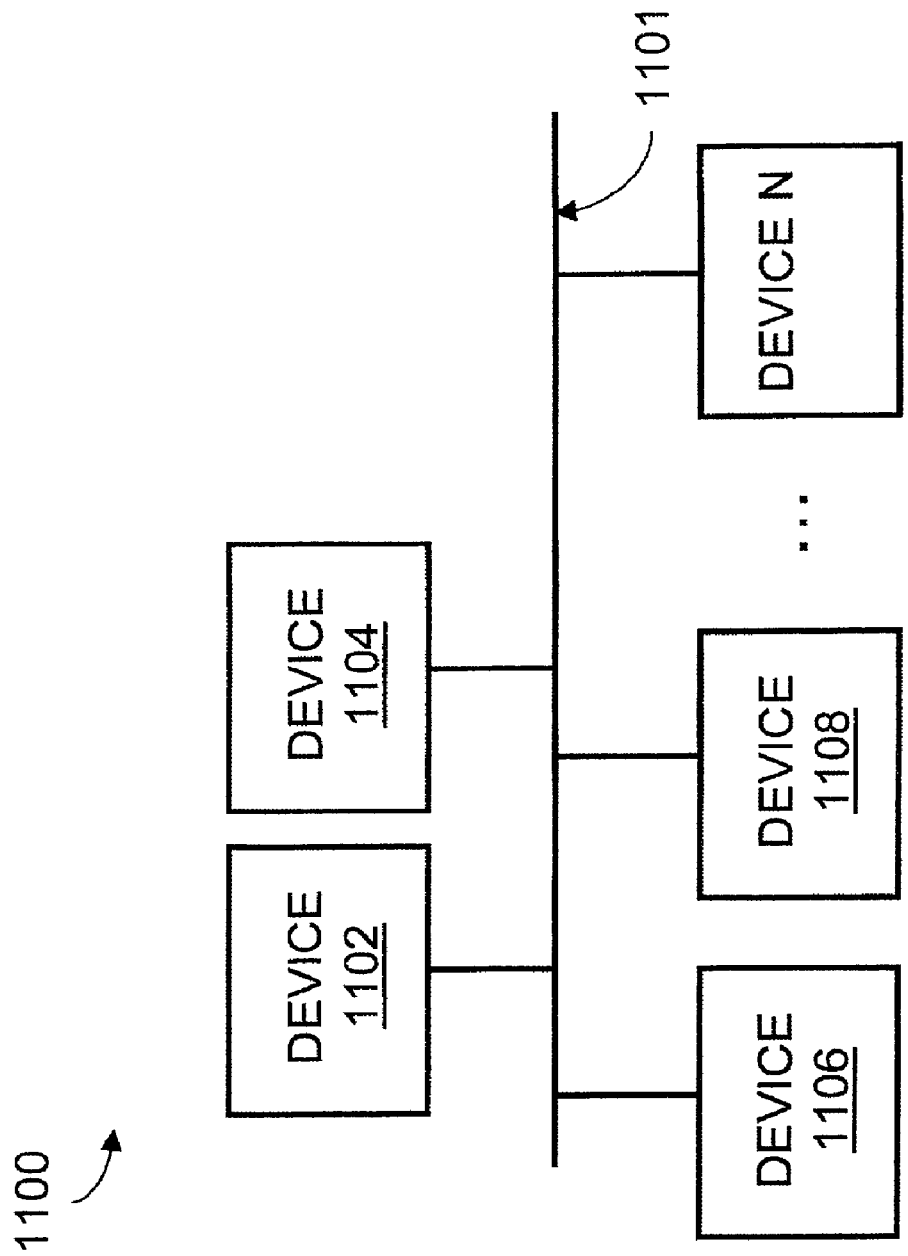
FIG. 11 schematically shows one system with multiple devices communicating on a common bus, in accord with the invention.

FIG. 11 shows one bus system 1100 of the invention. Bus system 1100 includes bus 1101 and a plurality of devices, such as devices 1102, 1104, 1106, 1108 . . . N. Bus 1101 is communicatively connected to the plurality of devices. The plurality of devices may include input/output (I/O) devices. An example of an input/output device may include a memory device such as a random access memory (RAM) device. Another example of an input/output device may include a microprocessor. Each of devices 1102, 1104, 1106, 1108 . . . N encodes its data with a unique code, such as described herein. Each of devices 1102, 1104, 1106, 1108 . . . N also decodes encoded data from the other devices so that communication between devices may occur. These codes are generally orthogonal codes, such as Gold codes, Walsh codes, and pseudo-random noise (PN) sequences. Those skilled in the art should appreciate that other types of codes may be used to encode the data in accord with the teachings herein. Encoding and decoding of data may for example be similar to encoding and decoding methods previously described in FIGS. 3 and 4. Those skilled in the art should appreciate that other encoding and decoding methods may be used in accord with the teachings of the invention.

FIG. 12 shows one device 1200 of the invention. Device 1200 includes transmitter 1202 and receiver 1204. Transmitter 1202 may include data generator 1206 and encoder 1208. Data generator 1206 may be configured to generate data for device 1200. Data generator 1206 is communicatively connected to encoder 1208. Encoder 1208 may be configured to encode data of device 1200. Encoder 1208 may include exclusive NOR (XNOR) logic gate 1210, code generator 1214, and driver 1212. Exclusive NOR logic gate 1210 may be configured to logically combine data from data generator 1206 and a code from code generator 1214, thereby encoding the data of device 1200. The code may include an orthogonal code. Exclusive NOR logic gate 1210 is communicatively connected to driver 1212. Driver 1212 may be configured to drive the encoded data of device 1200 through input/output port 1203 of device 1200 and onto a bus, such as bus 202 of FIG. 2.

Receiver 1204 may include a plurality of decoders, such as decoders 1216, 1218, 1220 . . . N, where N is the number of devices communicating on the bus, such as shown in FIG. 11. The plurality of decoders may be communicatively connected to the input/output port 1203 of device 1200. The plurality of decoders may be configured to decode data such that each decoder is used to respectively decode data of one other device connected to the bus; the individual decoders thus generate a code used to respectively encode the data of the other device. Methods used to decode data of the other devices may be similar to decoding methods previously described in FIGS. 2, 4, and 10.

Transmitter 1202 and receiver 1204 may be alternatively configured to operate as a bus controller. For example, a bus, such as bus 202 of FIG. 2, may include a bus controller having multiple transmitters for encoding data of a plurality of devices connected to the bus. The bus may also include multiple decoders for respectively decoding data of the plurality of devices. Each device may be assigned a unique code, such as an orthogonal code described in FIG. 3. For example, when data is received from one of the devices, the data is encoded with an orthogonal code. The data may be decoded either by the bus controller or by a device for which the data is intended. Decoding the data may include correlating the data against the code used to encode the data.

Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method of accessing a bus by a first device and a second device, comprising the steps of:
    encoding data of the first device with a first code to yield a first serial binary signal comprising the encoded data of the first device;
    encoding data of the second device with a second code to yield a second serial binary signal comprising the encoded data of the second device; and
    superimposing the first serial binary signal with the second serial binary signal to produce a composite signal on the bus.

2. The method of claim 1, wherein the first code is substantially orthogonal to the second code.

3. The method of claim 1, wherein the first code comprises a pseudo-random noise code.

4. The method of claim 1, wherein the second code comprises a pseudo-random noise code.

5. The method of claim 1, wherein the first and second codes comprise at least one of a Gold code and a Walsh code.

6. The method of claim 1, wherein the step of encoding comprises a step of multiplying the data of the first device with the first code.

7. The method of claim 6, wherein the step of multiplying comprises a step of logically combining the data of the first device with the first code through an exclusive NOR.

8. The method of claim 1 further comprising a step of extracting the data of the first device from the composite signal by correlating the encoded data of the first device with the first code.

9. The method of claim 8, wherein the step of extracting comprises a step of synchronizing the encoded data of the first device with a clocked first code.

10. The method of claim 9, wherein the step of synchronizing comprises generating the first code.

11. The method of claim 9, wherein the step of extracting further comprises a step of multiplying the clocked first code with the encoded data of the first device.

12. The method of claim 11, wherein the step of extracting further comprises a step of integrating a product of the clocked first code and the encoded data of the first device generated by the step of multiplying.

13. The method of claim 12, wherein the step of extracting further comprises a step of sampling an integration of the product generated by the step of integrating to generate a clocked integrated product.

14. The method of claim 13, wherein the step of extracting further comprises comparing the clocked integrated product to generate a feedback signal used for acquiring the first code of the encoded data of the first device.

15. The method of claim 1 further comprising a step of extracting the data of the second device from the composite signal by correlating the encoded data of the second device with the second code.

16. The method of claim 1 further comprising amplifying the composite signal.

17. The method of claim 1 further comprising filtering the composite signal.

18. The method of claim 1 further comprising tracking the encoded data of at least one of the first and second devices.

19. A bus system for allowing substantially concurrent access to a bus by a first device and a second device, comprising:
    an encoder that encodes data of the first device with a first code to yield a first serial binary signal comprising the encoded data of the first device and encodes data of the second device with a second code to yield a second serial binary signal comprising the encoded data of the second device; and
    a gate communicatively connected to the encoder and configured to superimpose the first serial binary signal with the second serial binary signal to produce a composite signal on the bus.

20. The bus system of claim 19 further comprising a correlator communicatively connected to the gate and configured to correlate the encoded data of the first device with the first code.

21. The bus system of claim 20, wherein the correlator comprises a synchronizer for synchronizing the encoded data of the first device with a clocked first code.

22. The bus system of claim 21, wherein the correlator further comprises a code generator communicatively connected to the synchronizer for generating the first code.

23. The bus system of claim 21, wherein the correlator further comprises a multiplier communicatively connected to the synchronizer for multiplying the encoded data of the first device with the clocked first code.

24. The bus system of claim 23, wherein the correlator further comprises an integrator for integrating a product of the multiplier to generate a decoded data of the first device.

25. The bus system of claim 24, wherein the correlator further comprises:
    a sample-and-hold unit communicatively connected to the integrator for clocking the decoded data of the first device; and
    a clock communicatively connected to the sample-and-hold unit for providing a clock signal to the sample-and-hold unit.

26. The bus system of claim 25, wherein the correlator further comprises a comparator communicatively connected to the sample-and-hold unit and communicatively connected to the synchronizer for detecting a threshold of the decoded data to generate a feedback signal for the synchronizer to acquire the encoded data.

27. The bus system of claim 19 further comprising an amplifier communicatively connected to the gate and configured to amplify the composite signal.

28. The bus system of claim 27 further comprising a filter communicatively connected to the amplifier to filter the composite signal.

29. The bus system of claim 28 further comprising a tuner communicatively connected to the amplifier and communicatively connected to the filter for tracking the encoded data of the first device.

30. The bus system of claim 19, wherein the first code is substantially orthogonal to the second code.

31. The bus system of claim 19, wherein the encoder comprises a code generator for generating the first code.

32. The bus system of claim 31, wherein the encoder further comprises a logic gate communicatively connected to the code generator for logically combining the data of the first device with the first code.

33. The bus system of claim 32, wherein the logic gate comprises an exclusive-NOR logic gate.

34. The bus system of claim 32, wherein the encoder further comprises a driver communicatively connected to the logic gate for outputting the first serial binary signal to the bus.

35. The bus system of claim 19, wherein at least one of the first and second codes comprises a pseudo-random noise code.

36. The bus system of claim 19, wherein the first and second codes comprise one of a Gold code and a Walsh code.

37. A bus communication system having a plurality of devices communicatively connected with a bus, wherein each of the devices comprises:

an encoder for encoding data of the device containing the encoder with a unique orthogonal code to yield a serial binary signal comprising the encoded data of the device containing the encoder and for driving the serial binary signal onto the bus to form a composite signal comprising the serial binary signal of each of the plurality of devices; and one or more decoders, wherein each of the decoders is configured to decode the encoded data of another one of the devices from the composite signal by correlating the encoded data of the other one of the devices with the unique orthogonal code used to yield the serial binary signal of the other one of the devices, wherein access to the bus and communication on the bus by each of the plurality of devices is substantially concurrent.

* * * * *